Sept. 16, 1941.   H. N. CARVER   2,256,015
SIGNALING DEVICE
Filed April 21, 1938
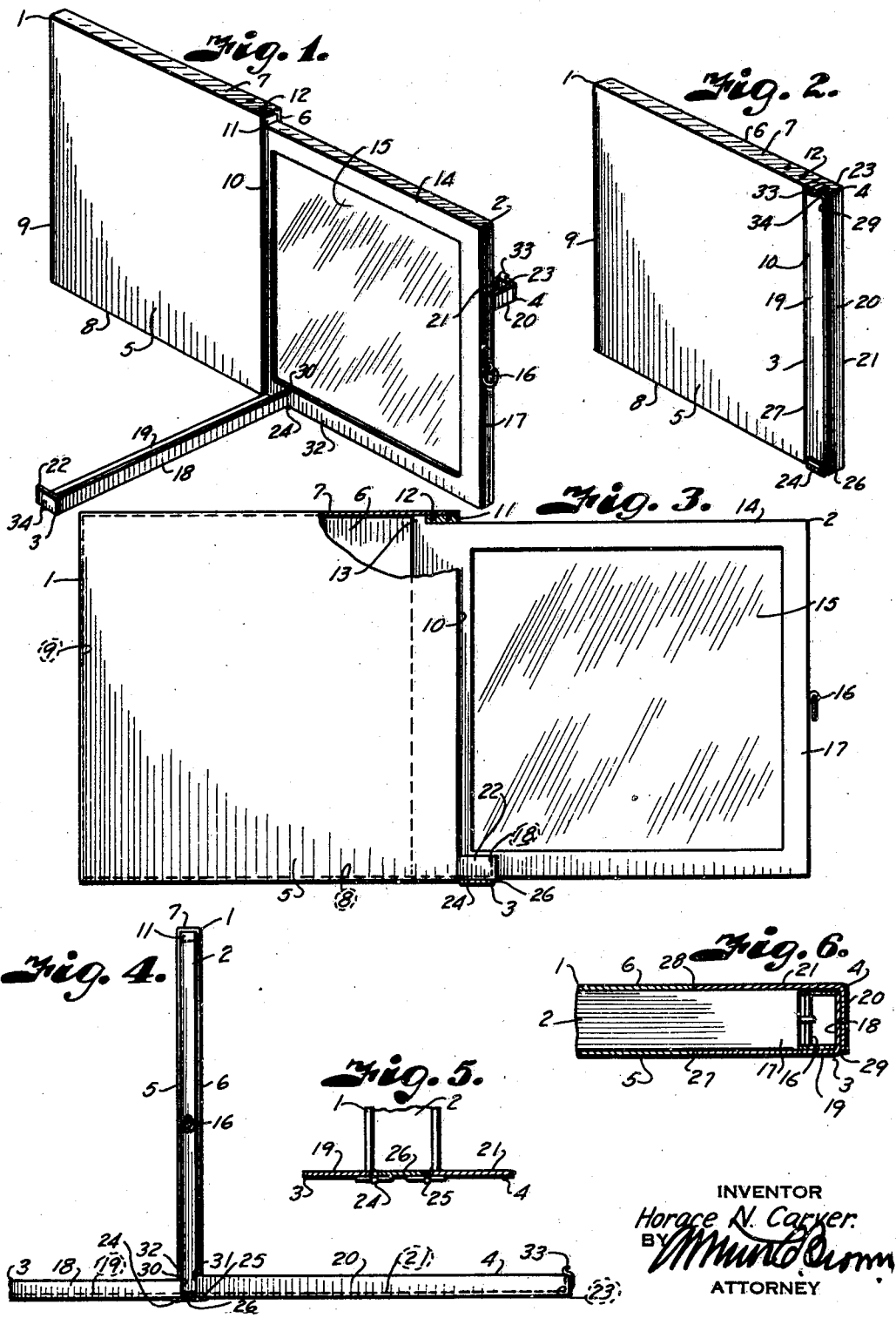
INVENTOR
Horace N. Carver.
BY
ATTORNEY Patented Sept. 16, 1941

2,256,015

UNITED STATES PATENT OFFICE 2,256,015

SIGNALING DEVICE

Horace N. Carver, Wichita, Kans.

Application April 21, 1938, Serial No. 203,348

5 Claims. (Cl. 206—44)

This invention relates to signaling devices and more particularly to a portable signal adapted to be conveniently placed on highways and similar thoroughfares for warning motorists and the like of obstructions on a highway.

It is ordinarily difficult for operators of vehicles such as loaded trucks to pull off the road when it becomes necessary to make repairs on the vehicles under their control. Should the motor of a truck fail or the tires need changing, the stalled or otherwise stationary vehicle creates a hazard on the road, not only to approaching motorists, but also to the truck operators and the property under their control.

It is the principal object of the present invention to provide a signal of the character commonly known as a "road flare" which is capable of reflecting and/or refracting light rays generated by the lights of approaching vehicles, back approximate their source to warn the occupants of those vehicles of the presence of obstructions on roads.

Other important objects of the present invention are to provide a collapsible light reflecting and/or refracting signal of sturdy and durable construction capable of withstanding shocks and jars without damage to the signal; to so design the signal that it is difficult to tip over accidentally; to provide a housing for the reflector or refracting element of the signal which also acts as a supporting standard therefor; to provide a compact and easily operable signal of a high degree of efficiency; to provide a protective mounting for the reflector or light refracting element of the signal; to provide the housing with foldable members forming a closure for the housing in one condition and a standard for the signaling element in another condition; to provide for limiting sliding movement of the signaling element relative to the housing; to provide an arrangement for locking the housing closing element in folded relation; to so arrange the signaling element standard members relative to the signaling element as to maintain the same against folding movement when the signaling element is in operative condition; and to provide improved parts and arrangements of parts making up a signaling device according to the present invention.

In accomplishing these and other objects of the present invention, I have provided improved details of structure, the preferred form of which is illustrated in the accompanying drawing, wherein:

Fig. 1 is a perspective view of a signaling device embodying the features of the present invention showing the device in operative condition.

Fig. 2 is a perspective view of the signaling device when in collapsed condition adapted to be stored.

Fig. 3 is a side elevational view of the signaling device in operative condition, part of the housing being broken away to illustrate the manner of limiting extraction of the signaling element from the housing.

Fig. 4 is an end elevational view of the signaling device particularly illustrating the signaling supporting standards for maintaining the signaling element in operative condition.

Fig. 5 is a detail end elevational view illustrating the manner of attaching the standard elements to the housing, the elements being shown in cross-section.

Fig. 6 is a detail horizontal cross-section through one end of the housing illustrating the relation of the standard members when in housing closing condition.

Referring more in detail to the drawing:

The invention generally includes a housing 1, a signaling element 2 slidably mounted in the housing, and standard or base members 3 and 4 which serve to close the housing when the device is not in operative condition and which serve as supporting base, standard or bracing members when the device is in operative condition.

The housing 1 preferably includes a box-like structure having side walls 5 and 6, top and bottom walls 7 and 8 respectively, and an end wall 9. The front end 10 of the housing is normally open for slidably receiving therein the signaling element 2.

A stop member 11 is preferably provided on the top wall 7, for example, of the housing at the open end thereof and is fixed thereto as by fastening devices 12 for locking engagement with a lug 13 preferably formed integrally on the frame 14 of the signaling element 2 when the signaling element is withdrawn to the outer end of the housing.

As a matter of practice, the signaling element is first inserted in the housing and the stop member 11 is subsequently applied so as to lock the signaling element in semi-permanent relation to the housing.

The signaling element 2 has a plate 15 or a plurality thereof suitably mounted in the frame 14, the plate 15 preferably being of a character adapting it for reflecting and refracting light rays impinging thereagainst back approximate their sources of incidence. A suitable handle element 16 is also provided on the outer end 17 of the frame for facilitating withdrawing the signaling element relative to its housing.

In order to close the open end 10 of the housing, the standards 3 and 4 are provided which are preferably of angular shape and consist of right angularly disposed flanges 18—19 and 20—21, the outer ends of each of which are joined by cap members 22 and 23. The inner ends of the standards 3 and 4 are hinged as at 24 and 25 to the outer end 26 of the bottom wall 8 of the housing in such a manner that the standards may be hinged upwardly when the signaling element is in housed condition to provide a substantially plane surface at their junctures 27 and 28, Fig. 6, when in closed position. The flanges 18 and 20 of the standards are also arranged for overlapping relation when the standards are closed as shown at 29 in Fig. 6.

It is desirable to lock the standards 3 and 4 in closed condition when the device is not being used, and also in open position when the standards form a support to maintain the signaling element in operative condition. In order to maintain the signaling device in operative condition, the inner ends of the flanges 19 and 21 are spaced sufficiently, as particularly illustrated at 30 and 31, in Figs. 1 and 4, to permit sliding engagement of the lower portion 32 of the frame therebetween when the signaling element is being withdrawn from the housing member. This engagement of the standards and signaling element prevents buckling of the elements to hinged or closed condition and forms a brace which adequately withstands severe wind pressures ordinarily tending to tip over the signaling device.

The cap member 23 of the overlapping standard 4 is preferably provided with a spring clip locking device 33 engageable over the outer corner 34 of the standard 3, when in closed position, to lock the standards relative to each other for closing the housing and retaining the signaling element within the housing.

The operation of a signaling device constructed as described is as follows:

The signaling device is normally stored in the condition illustrated in Fig. 2 and, when the necessity arises, may be removed from its storage place and carried to its point of use. The clip lock 33 is raised to permit the standard 3 to be hinged outwardly relative to the housing which also permits a similar hinging movement of the standard 4. The handle element 16 is then grasped to withdraw the signaling element 2 from its housing 1 to a point at which the stop member on the housing engages the lug on the signaling element. During such withdrawal of the signaling element, the lower portion of the frame 14 passes between the inner edges of the flanges 19 and 21 of the supporting standards to lock the standards in open condition, the standards being positioned at substantially right angles to the plane of the housing and signaling element to form a brace offsetting substantial wind pressures to the end that the signaling element may remain in operative condition until it has served its purpose.

The signaling element is, of course, placed on the ground in such a manner that light rays from headlights of oncoming vehicles may impinge against the light reflecting and refracting portion of the signaling element and thus be returned to their source to warn the occupants of vehicles of an obstruction on the road.

The operation described is reversed when the signaling device has served its purpose, and the signaling device in collapsed and inoperative condition may easily be stored in any type of vehicle where it occupies a minimum amount of space.

Some of the advantages of a signaling element embodying the features of this invention are that the device is strong, rigid, durable, and will withstand rough treatment. Further, the device is economical of construction and admirably suited for the purpose for which it is designed.

What I claim and desire to secure by Letters Patent is:

1. In a signaling device of the character described, a housing having top, bottom, side and end walls, a signaling element slidably mounted in the housing, one of said housing end walls comprising a section having one end pivotally mounted on another of said walls, the other end of said section being movable away from the housing and laterally of the side walls thereof to allow movement of the signaling element outwardly relative to the housing and for engaging a support for the housing to maintain the housing upright and the signaling element in operative condition, and a substantially duplicate section having one end pivoted to the wall pivotally supporting the other section and cooperating with said first named section in forming said end wall, the other end of said second named section being movable laterally of the housing in a direction substantially opposite to the first named section to cooperate with the first named section in forming a support for the housing and the signaling element.

2. In a signaling device of the character described, a housing having top, bottom, side and end walls, a signaling element slidably mounted in the housing, one of said housing end walls comprising a section having one end pivotally mounted on another of said walls, the other end of said section being movable away from the housing and laterally of the side walls thereof to allow movement of the signaling element outwardly relative to the housing and for engaging a support for the housing to maintain the housing upright and the signaling element in operative condition, and a substantially duplicate section having one end pivoted to the wall pivotally supporting the other section and cooperating with said first named section in forming said end wall, the other end of said second named section being movable laterally of the housing in a direction substantially opposite to the first named section to cooperate with the first named section in forming a support for the housing and the signaling element, said sections having portions adjacent their pivoted ends engageable with opposite sides of the signaling element when moved outwardly relative to the housing for retaining said sections in pivoted housing and signaling element supporting condition.

3. In a signaling device of the character described, a housing having top, bottom and side walls and an end wall, a frame adapted to carry a signaling element substantially conforming in shape to the housing and mounted therein, a section having its lower end pivotally mounted on a portion of said bottom wall, said section being movable laterally of the housing to allow movement of the frame outwardly relative to the housing and for engaging a support for the housing to maintain the housing upright and the frame in operative condition, and a substantially duplicate section pivoted to said bottom wall adjacent the first named section, said sections having overlapping engagement with each other when closed to form another end wall for the housing.

4. In a signaling device of the character described, a housing having top, bottom and side walls and an end wall, a frame adapted to carry a signaling element substantially conforming in shape to the housing and mounted therein, a section having its lower end pivotally mounted on a portion of said bottom wall, said section being movable laterally of the housing to allow movement of the frame outwardly relative to the housing and for engaging a support for the housing to maintain the housing upright and the frame in operative condition, a substantially duplicate section pivoted to said bottom wall adjacent the first named section, said sections having overlapping engagement with each other when closed to form another end wall for the housing, and cap members closing the upper ends of said sections to supplement the top wall of the housing for enclosing said frame.

5. In a signaling device of the character described, a housing having top, bottom and side walls and an end wall, a frame adapted to carry a signaling element substantially conforming in shape to the housing and mounted therein, a section having its lower end pivotally mounted on a portion of said bottom wall, said section being movable laterally of the housing to allow movement of the frame outwardly relative to the housing and for engaging a support for the housing to maintain the housing upright and the frame in operative condition, a substantially duplicate section pivoted to said bottom wall adjacent the first named section, said sections having overlapping engagement with each other when closed to form another end wall for the housing, and cap members closing the upper ends of said sections to supplement the top wall of the housing for enclosing said frame, one of said cap members having a locking member engageable with the other section to retain the sections in overlapped relation.

HORACE N. CARVER.